March 11, 1941.  R. H. PREWITT  2,234,196
PROPELLER OR ROTOR CONSTRUCTION
Filed July 31, 1935  2 Sheets-Sheet 1
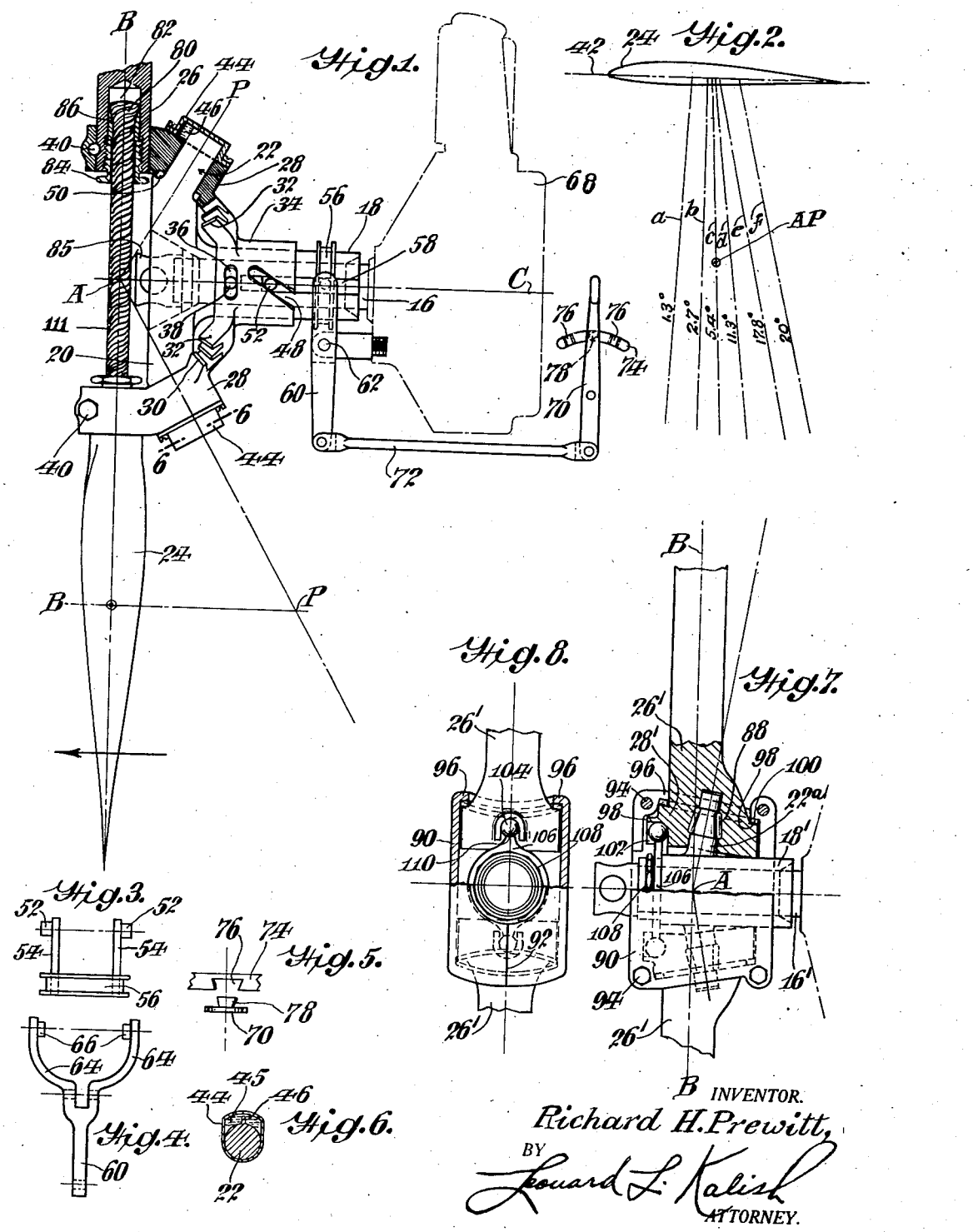
INVENTOR.
Richard H. Prewitt,
BY Leonard L. Kalish
ATTORNEY.

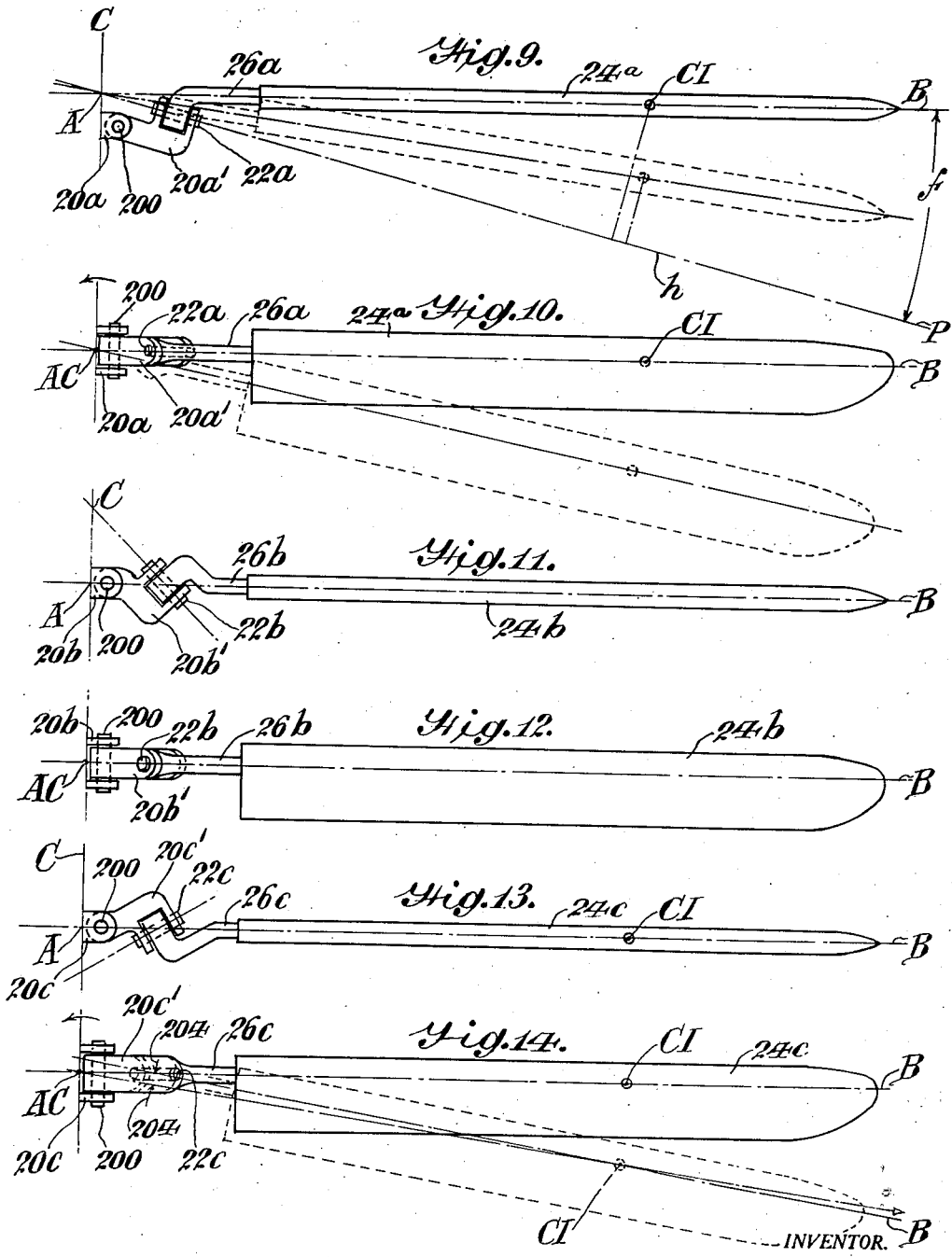

Patented Mar. 11, 1941

2,234,196

UNITED STATES PATENT OFFICE 2,234,196

PROPELLER OR ROTOR CONSTRUCTION

Richard H. Prewitt, Lansdowne, Pa.

Application July 31, 1935, Serial No. 34,023

8 Claims. (Cl. 170—164)

The present invention relates to certain new and useful variable pitch propellers for aircraft either for propelling aircraft in forward flight or for providing vertical lift for aircraft.

The object of the present invention is to so juxtapose the various forces which can act upon a propeller blade or rotor blade, and to so determine the direction and magnitude of these forces relative to each other as to effect any desired and predetermined blade angle setting for any operating condition.

Another object of the present invention is to provide means whereby the pitch of the propeller or rotor blades will tend to settle into an equilibrium position at or near their most effective angles of attack in all conditions of operations.

A propeller or rotor in accordance with my invention comprises a plurality of blades each mounted on an individual pivot making an acute angle with the plane perpendicular to the main axis of rotation of the propeller or rotor. The angle for the blade pivot having once been fixed and other constants of the device settled on which are ordinarily considered in design of a propeller or a rotor for lifting purposes, the characteristics of a given installation can be readily determined so that the blades will automatically set themselves on their pivots to have a favorable, if not indeed the optimum angle of attack for any given speed of rotation or translation under constant operating conditions.

Thus, by setting the pivot axis of the blade so that the line of the pivot axis will diverge from the plane perpendicular to the axis of rotation (sometimes more commonly termed the "disc") in a direction opposite to the intended lift of the propeller or rotor, the accelerating torque incident to power input will tend to increase the blade angle, whereas if the pivot axis is so disposed that the line of the pivot axis diverges from the plane perpendicular to the axis of rotation in the same direction as the intended direction of the lift of the propeller or rotor, then the torque incident to power input will tend to decrease the blade angle; the former disposition of the pivot axis being preferred for propellers intended to supply forward propulsion of the craft, or propellers or rotors intended for normal operation either for vertical lift under power or for auto-rotational sustention, while the latter disposition of the pivot axis is the one preferred whenever it is desired to increase the R. P. M. of a rotor or a propeller-like structure without increasing its thrust or lift and where it is desired to decrease the induced drag during such power input. Conversely, the cessation of accelerating power input causes a decrease in pitch angle in the first case and an increase in incidence in the second case.

Likewise, by predetermining the direction and magnitude of the aerodynamic forces on the blade in relation to the location of the pitch-varying blade pivot axis, the relationship between aerodynamic forces and the location of the pitch-varying blade pivot axis is so arranged according to the present invention, as to automatically tend to vary (increase or decrease) the angle of incidence of the blades (the angle of the blade to the disc) in such a way as to tend to float the blade at a predetermined effective angle of attack (that is, at a given predetermined weighted average angle of attack regardless of the changes in the magnitude and direction of air flow with respect to disc or blade elements). Such predetermination of direction and magnitude of aerodynamic forces in relation freely pivoted but non-revoluble air foils is disclosed in my Patent No. 1,989,291.

By balancing the torque force, the inertia of the blades resisting rotation, the centrifugal force on the blades, and aerodynamic forces on the blades, the balance or equilibrium position is attainable in which the blades will have alternately the most efficient angle of attack for any one of several operating conditions.

So also by suitably proportioning the several different forces and/or the turning moments through which they act, a variable equilibrium point is attainable for the variant operating conditions, as for instance, the condition of starting and the condition of full R. P. M., or the stationary condition of the craft, or the full speed of the craft, or the condition of full torque, or free wheeling.

The centrifugal force acting on the masses tends to retain the mass in its outermost position with respect to the axis of rotation of propeller or rotors, and thereby opposes all other forces which may act upon the blade, tending to displace it from such outermost position.

In addition to the torque due to power input and the inertia of the blades (which, in combination with the torque, tend to turn the blades about their respective pivots), and in addition to the centrifugal force which may tend to oppose such turning, the aerodynamic forces are made to favor or oppose such turning by the use of an air foil section, and by so locating the pitch-varying blade pivot axis in relation to the resultant air-load vectors of such section, that the moments about the pitch-varying blade pivot axis will cause the blade to tend to float at a given angle of attack (that is, the disc component of the aerodynamic forces will be fore or aft of the blade).

With the above and other objects in view which will appear more fully from the following description, the present invention contemplates a propeller or rotor having each of its blades pivoted about a pivot disposed at an angle to the longitudinal axis of the blade so that the centrifugal forces, the aerodynamic forces and the torque forces, acting upon the blade, will create turning moments about such pivot axis effective to influence the blade angle setting or pitch setting of the blade.

The present invention further consists of other novel features and details of construction, all of which will appear more fully from the following detailed description and accompanying drawings.

In the drawings:—

Figure 1 is an elevational view, partly in section and partly diagrammatic in character of one embodiment of a propeller in accordance with my invention for propelling aircraft in forward flight. The point B indicates the center of air thrust or load for the entire blade while the plane perpendicular to the line B—B or perpendicular to the longitudinal blade axis and containing the line B—P is the plane of the resultant air load vectors, and the point P is the point at which the pivotal axis A—P pierces the plane of the resultant air load vectors, that is, where the pivotal axis and the plane of the resultant air load vectors intersect each other.

Figure 2 is a diagrammatic representation of a section of a blade for any of the embodiments of the present invention, on a plane passing through the longitudinal center of air thrust or load for the entire blade perpendicularly to the longitudinal blade axis; said plane being herein referred to as the plane of the resultant air load vectors. The vectors shown in Figure 2 are illustrative of the resultant air load vectors on the blade at the various angles of attack indicated for purposes of illustration and the sector of the area of this plane bounded by the vectors $a$ and $f$ is the stable region of the blade.

Figure 3 is a detailed plan view showing a collar and pins used in manually adjusting or setting the angle of the blades in Figure 1.

Figure 4 is a detail of the lever for actuating the collar shown in Figures 1 and 3.

Figure 5 is a fragmentary plan view of the locking sector and hand lever shown in Figure 1 and forming part of the means for manually adjusting the blade angle.

Figure 6 is a detail sectional view on the line 6—6 of Figure 1.

Figure 7 is an elevational view of a second form of propeller embodying my invention, a part being cut away for purposes of illustration.

Figure 8 is an end view taken from the left of Figure 7, part being cut away for purposes of illustration.

Figures 9 and 10 are respectively a side view and a plan view of a propeller type rotor in accordance with my invention for providing vertical lift for air craft.

Figures 11 and 12 are respectively a side and plan view of a second form of propeller type rotor in accordance with my invention.

Figures 13 and 14 are respectively a side view and plan view of a third form of propeller type rotor in accordance with my invention.

The propeller installation illustrated in Figure 1 comprises a drive shaft 16 whose axis of rotation is represented by the line AC. Fixed on the shaft 16 is a sleeve 18 having a hub 20 formed at the outer end thereof, and on which are gudgeons or pivots, one for each blade 24 of the propeller, one such pivot appearing at 22. As appears clearly in Figure 1, the axis AP of each pivot 22 lies in a plane radial to the main axis of rotation AC and at an angle to the plane perpendicular to the axis of rotation AC so that each pivot axis intersects the axis of rotation. The longitudinal axis AB of each individual blade, however, lies also at an angle to the axis of its pivot 22, each blade root 26 having a blade root bracket or arm 28 offset therefrom and journalled on the pivot 22. However, it is not essential that the blade axis or pivot axis always intersect the axis of rotation. Each blade-root bearing bracket or arm 28 has a series of segmentally arranged teeth 30 thereon which mesh with a similar series of teeth 32 on a segmental gearing 34, whose hub has the form of an outer sleeve surrounding the sleeve member 18. The blades 24, therefore, are connected together through gearing consisting of teeth 30 and 32, so that they must turn about their axes 22 simultaneously and with equal degree. However, as will hereinafter appear, it is not necessary to connect individual blades in this manner. The sleeve portion of the gear 34 has circumferential slots therein, one of which appears at 36, and the sleeve 18 has pins 38 thereon projecting into slots 36 so as to hold the segmented gear 34 in fixed position longitudinally of member 18, and to limit the degree of rotation of the segmented gear 34, thereby limiting the rotation of the propeller blades about the axes AP. The blade roots 26 and blade-root brackets or arms 28 are shown as formed separately and clamped together by bolts 40, but I do not limit myself to this feature of construction.

In the form of construction shown in Figure 1, as the blades 24 swing about the axes A—P they change their angle of attack. I prefer to arrange the blades 24 of a propeller for forward motion so that an efficient angle of attack will occur (as for instance 5.4° shown in Figure 2) when the center of mass of the blade is in its outermost position with respect to the main axis of rotation AC—that is, farthest from said axis. In the embodiment shown in Figure 1, the disc drag or air pressure against the blades parallel to the plane of the disc, tends to turn the blades about the axes AP of the pivots 22 and thereby to increase the angle of attack until an angle of attack is reached such that the resultant vector representing the total air forces passes through the pivot axis AP. As the blades turn about the axes AP, however, they move away from the perpendicular to the axis AC, and the angle between their individual longitudinal axes and the plane perpendicular to the main axis of rotation AC becomes greater and approaches more nearly that of the axes AP. The turning moments, due to drag, about AP therefore are less effective as their coupler arms shorten. The blades thereby become increasingly subject to a centrifugal force tending to throw them back toward the plane perpendicular to AC.

A balance is therefore soon produced between the centrifugal forces and the air pressure with reference to the axes AP for any constant speed of rotation or constant rate of acceleration. This position or point of balance is one in which the total turning moment acting on each blade about its individual axis AP is zero, and occurs at a different angle or position of the blades with respect to axes AP for each different condition of operation of the propeller. However, there is a particular angle of attack at which the propeller acts most efficiently at each given speed. It is evident, therefore, that the point of balance between the forces on the blades about their individual pivots and the most efficient angle of attack for the given constant speed of rotation should occur simultaneously. The solution of the problem of forming the mechanism to act in this manner can be readily found by one accustomed to the design of airplane propellers.

When marked changes in the throttle setting are made, material amounts of kinetic energy are transferred from the propeller shaft to the blades or from the blades to the shaft due to the inertia of the blades and such inertia effects set up turning moments on the blades about the axes AP throwing them rearwardly or forwardly of the position desired. However, the movement due to inertia is, in general, in the direction in which the air pressure will tend to move the blade as the speed changes due to the change in throttle. For instance, in the form shown in Figure 1, an increase in throttle opening causes an acceleration of the propeller hub while the blades lag behind the axes AP, thereby throwing the blades to a position of higher angle of attack.

Furthermore, if desired for obtaining automatic stability, the propeller blade can be given an airfoil section such as that shown in Figure 2 in which, as the angle of attack increases, the resultant air-load vector representing the total air forces on a given blade moves aft in relation to the pivot AP and as the angle of attack decreases the vectors move forward in relation to said pivot. The action of these resultant air-load forces about the pivot AP cause turning moments about said pivot, which, either by themselves or in combination with the centrifugal restoring moments about the same pivot tend to keep the blades floating at a predetermined angle of incidence. For example, if the centrifugal restoring moment is designed to be substantially zero when the blade is at 5.40° in normal flight, the blade will automatically tend to operate at this predetermined angle of attack. Should the blade be momentarily shifted into a higher angle of attack due to accelerating forces or momentary changes in air-flow, the air load forces would tend to rotate the blade forward into lower angles of attack. On the other hand, should the blade angle of attack be altered into lower angles of attack due to decelerating forces or momentary changes in air-flow the air load vectors representing the lower angles of attack being located forward of the pivot AP will tend to rotate the airfoil blade back into higher angles of attack. Such shifting of the total air load vector causes a balance to be reached between all the forces involved with a much less change in angle of incidence than would otherwise be the case.

The way in which the angle of attack of the blade, and the corresponding way in which the center of pressure of the blade 24 shifts transversely of the blade is indicated in Figure 2 by a series of vector lines, a, b, c, d, e, and f, representing the resultant air loads for the airfoil or blade at several angles of attack. Each of the lines a, b, c, d, e and f intersects chord line 42, of the blade 24 at the center of air pressure, the angle of attack for each vector line being written thereon.

The section shown in Figure 2 and the resultant aerodynamic forces indicated therein are the section and forces at the longitudinal loci of centers of pressure and the longitudinal loci of resultant aerodynamic forces.

As indicated diagrammatically in Figure 2, the blade cross-section in effect swings about the pivot AP and in doing so the blade section is presented at varying angles to a constant air flow present, thereby varying the angle of attack as the blade section swings about the pivot AP. Should the air-flow change its angle of attack in relation to the blade, as is the case in changing the velocity relationships between the flow in the plane of the disc and the flow normal to the disc, the resultant air-load vectors will automatically keep the blade floating at or approximately the predetermined effective (that is, weighted) angle of attack.

It may be noted that as the blade swings around the pivot AP into higher angles of attack the vectors representing higher angles of attack shown on the right of the diagram become operative and tend to rotate the blade forward into lower angles of attack. Should the blade move into lower angles of attack, the vectors on the left of the diagram representing the resultant forces at these lower angles of attack become operative and tend to rotate the airfoil back into higher angles of attack. Thus, it is apparent that, for the air loads acting on the airfoil, and in the construction shown the blade will stably pivot at a certain angle of attack (5.4°) for each given stable operating condition.

It will be understood that the blade 24 has an angle of attack of 5.4° when in what I call its neutral position, that is, the position in which the blade is most nearly at right angles to the axis of rotation AC. The lines representing the aerodynamic forces move progressively toward the trailing edge of the blade, lying to the rear of the axis AP at all angles of attack greater than 5.4° and progressively forward of the pivot AP at angles of attack lower than 5.4°. Airfoil sections in which the center of pressure moves rearwardly with increasing angle of attack are known as stable sections, and the stable area at the plane of the resultant air load vectors shown in Figure 2 is designated as a stable region. In my Patent No. 1,989,291 I have described more fully these stable areas of the resultant air load vectors and have shown the location of a pivot axis for an air foil in these stable regions and have shown the resultant stability of angles of attack through changes in air flow within a practical range. The present invention contemplates the application of such relationship between airfoil and pitch-varying pivot axis in revolving airfoils both under freely revolving conditions and under power-driven conditions.

A stable region in the plane of the resultant air load vectors, may be defined as that region in which the resultant air load vectors are arranged in consecutive increasing order of respective angular attack of the airfoil from the leading edge direction to trailing edge direction. An air load vector may be defined as a line representing all of the effective air forces acting on an airfoil when operating under one set of conditions.

The center of pressure of an airfoil is that point located in its cross-section at which all the air forces acting on the blade at any one time or under any one set of air conditions may be assumed to be concentrated.

This center of pressure is a fixed point in every airfoil for any one angle of attack.

An airfoil moving through air and having the air forces acting upon it (which air forces may lift it, move it, or otherwise displace it in any way) may be said to have a so-called "center of pressure," that is, the point at which all the air forces acting on the airfoil in a particular air-flow or angle of attack, may be said to be concentrated, so that if a single force of a resultant magnitude and direction were applied to that one point, such single force would have the same effect on the displacement or tendency to displace the airfoil as though the distributed air were acting on it.

This center of pressure may be considered either chordwise or longitudinally (or lengthwise) of the airfoil. To locate the center of pressure definitely, it must therefore be located both chord-wise and lengthwise of the airfoil.

Where the airfoil travels through the air or where the air flows over or past the airfoil in a chord-wise direction, at a generally constant angle throughout the length of the airfoil, then a variation in the longitudinal angle of the airfoil will not greatly shift the longitudinal disposition or location of the center of pressure. This could perhaps be easily exemplified by the wings or a fixed-wing airplane, where a slight increase or decrease in the dihedral angle of the wings will not greatly shift the center of air pressure longitudinally, and whatever shift does take place longitudinally does not greatly affect ultimate stability.

Where the airfoil travels through the air chord-wise but with a constantly changing angle between the direction of flow of air and the longitudinal direction of the airfoil, such as in rotative winged aircraft, then the center of pressure does tend to shift also longitudinally, responsive to the changes in angle between the air flow and the longitudinal direction of the airfoil.

For the purpose of airfoils, the treatment and consideration of the chord-wise location of the center of pressure has been universally considered the more critical study, because of the fact that the chord-wise location or variation in location of the center of pressure has a much more profound influence on the functions and utility and efficacy of the airfoil. Even in the consideration and analysis of airfoils of rotative sustention systems, or, more broadly, rotative thrust producing systems, the chord-wise location of the center of pressure is of primary consideration, whereas the longitudinal location of the center of pressure is of secondary consideration from the standpoint of the aerodynamic functions, utility and efficacy of the blade (not, however, from the standpoint of resonance, bending-moment and some of the other considerations which enter into the actual mechanical operation of the rotative sustention or thrust producing system).

With respect to the chord-wise location of the center of pressure of an airfoil, airfoils have been classified, inter alia, into what may be called fixed center of pressure airfoils and migratory center of pressure airfoils.

In the fixed-center-of-pressure airfoils, the center of pressure (chord-wise) remains fixed over the practical range of operation, notwithstanding the changes in the angles of attack. In the other class of airfoils, which may here be called migratory-center-of-pressure airfoils, the center of pressure shifts chord-wise with changes in angles of attack and responsive to such changes in angle of attack. These two classes of airfoils have been well-known and recognized and variously used in the past, as for instance the use of migratory-center-of-pressure airfoils of the "stable" type in my earlier Patent No. 1,989,291.

The migratory-center-of-pressure airfoils in turn have been of two kinds; broadly, those, on one hand, in which the center-of-pressure migrated rearward with decreases in angle of attack and migrated forward with increases in angle of attack (within practical range of intended operation) and those, on the other hand, in which the center-of-pressure migrated forward with decreases in angle of attack and migrated rearward with increases in angle of attack. The latter have been generally regarded as "stable" airfoils and the former generally called "unstable" airfoils.

The reason why the latter kind of migratory-center-of-pressure airfoil is generally regarded as a stable airfoil in the aeronautic world, is that the airfoil is inherently self-compensating against instability, namely, it automatically counteracts any self-increase or self-decrease in the angle of attack. Thus, for instance, an increase of angle of attack will move the center-of-pressure rearwardly in relation to the center of gravity and thereby enable this change in relative location of the center of gravity to tend to reduce the angle of attack. Likewise, an intentional or maneuvered decrease in angle of attack will shift the center-of-pressure forwardly in relation to the center of gravity so that this relative change of location between the center of gravity and center-of-pressure will tend to increase the angle of attack; thereby providing a self-stabilizing airfoil which will require maneuvered changes of angle of attack or superimposed controlled changes of angle of attack in order to fly it at an angle of attack other than the one at which it would normally tend to fly.

Thus, a "stable" airfoil will tend to fly at the same angle of attack for any given air speed if it is so supported as to have the necessary freedom.

Naturally, this function of the type of airfoil last discussed, namely, that function which is commonly recognized in the aeronautic field as the "stability" of the airfoil, is obtained only within a practical range of angles of attack, and that range is sufficient for practical operation. This means, naturally, that if the angle of attack on the airfoil were put in reverse, that is, if it were negative, the airfoil might or might not have the "stability" hereinabove discussed. Hence, the "stable region" of a stable airfoil, namely, one in which the center-of-pressure migrates rearwardly with increases in angle of attack has been a term well recognized and generally accepted in the aeronautic sciences as the region bounded on one side by the resultant air-load vector corresponding to the minimum angle of attack at which the blade still retains this stability function and bounded on the other side by the resultant air-load vector corresponding to the maximum angle of attack at which the blade still retains this stability function.

Hence, the term "stable region" may be defined as the segment or truncated segment swept by all the resultant air-load vectors which shift rearwardly with increasing angles of attack and forwardly with decreasing angles of attack.

The weighted average chord-section of an airfoil is that chord-section of an airfoil blade which represents the average chord-section of all the chord-sections of the blade along its entire length; each weighted according to its aero-dynamic effectiveness.

For different forward speeds and engine revolutions per minute, the most effective angles of incidence will be different, but a propeller designed so that it finds automatically the most advantageous angle of attack, say 5.4°, at one speed (preferably its cruising speed), will, in general, maintain approximately the same angle of attack at other speeds. The turning moments about the axes AP being zero, the blades may be said to "float" at the proximity of their most advantageous angle of attack.

However, the shifting relative position of the various forces acting on the propeller blades under changing conditions of speed and torque sometimes produces a flutter or hunting action about the axes AP and for this reason I prefer to provide a means for damping the motion of each blade AB about its pitch-varying axis AP. For this purpose, I have illustrated in Figures 1 and 6 a damping means comprising a cap 44 attached to each blade-root bracket or arm 28 over the outer end of its corresponding pivot 22. The cap 44 is half round at one side of the pivot 22 and elongated at the other side to form an oblong chamber 45 which is filled with heavy oil. On the end of the pivot 22 is a radial fin 46 which extends into the elongated section of the chamber 45, a small clearance being left between the edge of the fin and the inner face of the cap at one side. The fin and pivot extend clear to the inner face of the flat outer section of the cap so that when the cap is turned with respect to the fin by movement of the bearing 28, oil will be forced from one side of the fin to the other but at a restricted rate fixed by the clearance between the fin and the cap so as to produce a damping action.

When the propeller or rotor is in operation, the centrifugal force will keep the oil in the cap 44, but to prevent loss from leakage along the bearing between the bracket or arm 28, and the pivot 22, when the propeller is stationary, I have provided a packing 50 seated in a rabbet in the bracket or arm 28 at the inner end of the pivot 22.

I find it advantageous, moreover, in certain cases, to combine with the automatic means heretofore described for determining the angle of attack of the blades 24 with an operator controlled means whereby such angle may be set as desired. I have illustrated such a means in Figure 1 comprising helical slots in the sleeve 34, one of which appears at 48. In each of the slots 48 is a pin 52 carried at the end of a bar 54, the other end of which is fixed to a channelled ring or collar 56. The bars 54 are mounted to slide in longitudinal slots 58 in the sleeve 18 (and the collar 56). Pins 52 may be moved axially on the sleeve 18 by means of a lever 60, pivoted at 62 and having branched arms 64, 64, carrying pins 66 which project into the groove or channel in the ring 56. By swinging the lever 60, and therefore moving the pins 66, the pins 52 may be moved longitudinally of inner sleeve 18 to turn the sleeve 34 about the axis of rotation and thereby turn the blades 24 about their individual pivots 22 by means of gearing 30 and 32, so as to set the blades to have the desired angle of attack. It will be understood that the operator's seat is at the rear of the engine indicated in dotted lines at 68, and a hand lever 70 is provided for the operator which is connected to the lever 60 by means of a link 72. Therefore, when the operator moves the hand lever 70 he adjusts the angle of the blades. In order, however, to prevent release of the manually set position of the blades when the forces on the blades are badly out of balance (a condition such as would be present in accelerating or decelerating the engine), I have provided a locking means for the lever 70 of semi-automatic character. In the arrangement illustrated, the locking bar or quadrant 74 has inwardly flaring notches 76 therein and one side of the bar 70 has an outwardly flaring lug 78 thereon, adapted to pass into any one of the grooves or notches 76. Due, however, to the complemental angles of the sides of the notches 76 and the sides of the lug 78, when there is pressure between the contacting faces of the lug and any given groove, the lug is locked in the groove but when such pressure is absent due to a balance of forces on the blades, lug 78 may spring out of the notch 76 as illustrated in Figure 5. To produce such automatic release of the lug 78 and notch 76, I prefer to make the lever 70 somewhat flexible and resilient in the direction transverse to the plane of the bar or quadrant 74, so that the lug 78 will be resiliently tensioned in a direction away from the quadrant 74 which carries the notches 76. When accelerating or power-driving the propeller or rotor there is enough pull on the connecting link 72 to retain the lug 78 in engagement with the inclined side of the notch 76. When, however, the power is cut off or the engine throttled down, or the power in any way disconnected, then the spring snaps the lug 78 outwardly into the position shown in Figure 5, so as to release the blades into their normal balanced pitch position. By this means, there is an automatic release of the pitch from any of the locked positions. The operator controlled means for setting the blades is useful for preventing automatic shift of the angle of attack during starting a plane from the ground, or in flying at high altitudes with supercharged engines, in making marked changes in the throttle setting, and under other conditions.

The centrifugal forces on the blades 24 in the direction of the plane perpendicular to the axis of rotation AC cause friction at the bearings between the brackets or arms 28 and the pivots 22, and may cause binding unless some means is used to prevent it. In the arrangement illustrated in Figure 1, I show for this purpose a flexible cable 111 connecting the inner ends of the two blades 24. Such connection is obtained by spreading the ends of the cable as shown at 80 in recesses 82 in the ends of the roots of the blades and threading hollow nuts 84 into the inner ends of the blade roots 26 to force the sleeves 86 against the spread ends of the cable to hold them in place and put it under initial tension. When the blades swing to some extent about the pivots 22, the distance between the inner ends of the blades is decreased and the tension in the cable 111 would thereby be relaxed except that the cap nut 85 at the outer end of the shaft 16 projects close to the cable 111 so that the cable is forced against the cap nut 85 and to bend around the end of the shaft when the blades have moved out of the line AB thereby maintaining the tension on the cable. However, I do not limit myself to the use of any tie between the inner ends of the blades.

In Figures 7 and 8, I have illustrated a second embodiment of my invention in which the centrifugal forces in the direction of the blade axes are taken up by anti-friction bearings. In the arrangement shown in Figures 7 and 8, 16' is a driving shaft having a hub 18' thereon on which are formed integral pivots 22'. Blades having roots 26', 26', have the inner ends of their roots enlarged to form brackets or arms 28' mounted on the pivot 22' by means of roller bearings 88. The blade roots 26 are secured, in the position illustrated, relative to the hub 18' by a cage 90, formed in two parts which divide along the line 92 passing through the center of the shaft 16'. The two halves of the cage 90 are normally secured together by means of bolts 94, 94, and the two halves each have flanges 96, 96, which project over shoulders 98, on the brackets or arms 28' so as to hold the blades in their proper position. An antifriction bearing 100 located between the flanges 96 and the hub projections 98 for carrying the centrifugal loads reduces the friction resisting the turning of the blades on their pivots 22'.

Each bracket or arm 28' has in one face thereof a recess formed in part by a hood 102 in which is a ball 104 fixed to a ring 106, on the shaft 16' at the end of a projection 110. The ring 106 is swivelled on the shaft 16', but held in place thereon against the sleeve 18' by the nut 108. The swivelled ring 106 and ball 104 serve to synchronize the movements of the blades 26' on the pivots 22'. No operator controlled means has been illustrated in Figures 7 and 8 for adjustment of the angles of the blades on pivots 22', but the automatic adjustment by operation of aerodynamic forces and centrifugal action occurs in the same manner as described in connection with Figure 1.

In Figures 9 to 14 inclusive, there is illustrated further embodiments or extensions of the present invention to illustrate its applicability to lift propellers of rotative-winged craft, commonly called rotors, and to illustrate the manner in which the pitch setting of the blades can be made responsive to torque variations in the hub or shaft either to increase the pitch with the increase of torque or to decrease the pitch with the increase of torque, depending merely upon a reversal of the angle of inclination of pivot to blade axis.

Thus, in Figures 9 and 10 the spar or blade root 26—a of the rotor blade 24—a is connected to the rotor hub or rotor hub appendage or rotor hub extension 20—a' through a pivot 22—a inclined with respect to the blade axis AB by the angle f; the pivot 22—a being so disposed in relation to the hub axis AC and the blade axis AB that its axis, that is, the pivot axis AP, will pass through the point of intersection of hub axis and blade axis.

The structure of the embodiment of the invention illustrated in Figures 11 and 12, as well as that of the embodiments illustrated in Figures 13 and 14, is similar to that illustrated in Figures 9 and 10 in that all three embodiments are rotors intended for producing vertical lift.

In the arrangement of Figures 11 and 12, the blade 24—b is shown in Figure 11 in its neutral position, the root 26—b of the blade 24—b being pivoted to an individual inclined pivot 22—b carried by the hub extension 20—b'. In Figures 11 and 12, the axis of rotation AC intersects the blade axis AB at one point, whereas the axis of rotation AC intersects the axis of the pivot 22—b of the individual blade at another point shown as lying above the neutral position of the blade. In Figures 9 and 10, as well as in Figures 11 and 12, the pivot axis AP inclines away from the plane perpendicular to the axis of rotation AC in the direction contrary to the direction of lift.

In the arrangement shown in Figures 13 and 14, the blade 24—c is shown in its neutral position in Figure 13, whereas the blade root 26—c is pivoted to an individual pivot 22—c whose axis is reversed as compared to the pivots 22—b and 22—a. In Figure 13, the hub extension 20—c' carries the pivot 22—c in such a position that the axis of such pivot intersects the axis of rotation AC below the point at which the blade axis AB intersects the axis of rotation. In other words, in Figures 13 and 14, the pivot axes AP incline away from the plane perpendicular to the axis of rotation in the same direction as the direction of lift of the propeller type rotor.

In Figures 11 and 12, the blade is shown for an increase in pitch with positive torque, or decrease in pitch with negative torque while in Figures 13 and 14, the blade is shown for a decrease in pitch with positive torque and an increase in pitch with negative torque. The term "positive torque" is here used to signify the torque that would normally be produced with power imparted to the hub or driving shaft, while negative torque is used to indicate the torque produced, for instance, by a braking action or a decelerating action on an already rotating member. The terms "decrease" and "increase" in relation to pitch are used with reference to the predetermined pitch setting of the blade in its neutral position.

In propeller rotors such as illustrated in Figures 9 to 14 inclusive, when used for creating lift in Autogiro machines, the rotation being due to the reaction of the air on the blades, there is little or no net drag in the plane perpendicular to the main axis of rotation and the positions of the blades on their pivots 22—a, 22—b, and 22—c and, therefore, their angles of attack are determined almost entirely by the torque or inertia force and air force and the centrifugal force. I find that, by varying the relative position of the pivot axes with respect to the main axis of rotation, I can increase or decrease the relative effect of the centrifugal force on the blade. The arrangement shown in Figures 9 and 10, is similar to that shown in Figure 1 where the centrifugal force acting on the blade 24—a at a given speed of rotation and angle of lag behind the neutral point is substantially eliminated as compared to that acting in the forms illustrated in Figures 11 and 12 or 13 and 14. This is due to the fact that in the arrangements shown in Figures 9 and 10 the line from the center of inertia CI to the axis of rotation AC passes substantially through the pivot axis in its neutral position. The restoring force resulting from the centrifugal forces in this case is substantially zero. In the case of angular pivots 22—b, and 22—c, the perpendicular from CI to the axis of rotation AC moves away from the axis AP as the blades 24—b and 24—c are deflected from neutral, so that the perpendicular no longer intersects the axis AP.

This movement of the center of inertia CI in relation to its neutral position and the pivots 22—b and 22—c induces a restoring moment which also may be explained by the statement that a revolving mass tends to remain at its farthest point from the axis of pivotation.

A restoring moment about the axis AP of the pivot is thereby generated equal to the centrifugal force multiplied by the perpendicular distance between the center of the pivot 22—b or 22—c and the line from CI to AC. In Figure 14, the moment arm is indicated by the distance between the two arrows 204.

In each of the arrangements illustrated in Figures 9 to 14 inclusive, there is a pivot 200 between the main axis of rotation of the propeller and the hub extension 20—a', 20—b' or 20—c', respectively, such pivot 200 lying in a plane substantially at right angles to the axis of rotation and being required when the propeller or rotor is used for creating vertical lift in order to avoid the effect of unsymmetrical lift on the craft.

In the form of my invention shown in Figures 9 to 14 inclusive where the flapping or coning hinge pivot 200 is incorporated, the blades cone up about this pivot in flight. Due to the fact that the blades are above the plane of the disc when coned up, there is a component of the centrifugal force which is normal to the longitudinal blade axis and which acts to oppose the lift forces produced by the air-loads (which air-loads manifest themselves visually in the coning). This downward normal component of the centrifugal force, opposes the lift forces creating the coning, and maintain a balance therewith (along with inertia forces) about the coning pivots. When the pitch-varying pivots are inclined in any of the ways shown in this application, and more particularly in Figures 9 to 14 inclusive, then this normal component of the centrifugal force is not only effective about the coning pivots but is also effective about the pitch-varying pivots which likewise permit the up and down displacement of the blade (that is, more or less in a direction parallel to the rotor hub axis).

In the embodiment shown in Figures 9 to 12 inclusive, where the axis line of the pitch-varying pivot projects below the blade, this normal component of the centrifugal force has an unstable influence, so that whenever the blade is not in what may be regarded as a center position with respect to said pitch-varying pivot on one hand and the said normal centrifugal component on the other hand, said normal centrifugal component will tend to accentuate the movement about said pitch-varying pivot. However, in the embodiment of the invention shown in Figures 13 and 14 where the axis line of the pitch-varying pivot projects above the blade, the downward normal component of centrifugal force has a stable influence with respect to the pitch-varying movement and tends to centralize the blade with respect to the pitch-varying pivot.

In the former case (Figures 9 to 12 inclusive), the stability of the blade is dependent on the aerodynamic forces and the component of the centrifugal forces which is parallel to the blade and which therefore tends to center the blade about the pitch-varying pivot in the forms shown in Figures 11 and 12 (and also in Figures 13 and 14). In the embodiment of the invention shown in Figures 13 and 14, not only does the centrifugal force component parallel to the blade tend to center said blade about the pitch-varying pivot but also the centrifugal component normal to the blade also tends to center the blade about said pitch-varying pivot. Thus, in the form of my invention shown in Figures 13 and 14, the normal component of the centrifugal force will have a self-centering or stabilizing influence, but in the forms shown in Figures 9 to 12 inclusive, the normal component of the centrifugal force will have an unstable influence on the resulting moments acting about the pitch-varying pivots. In the latter case, the combination of the stability produced by the air force and any self-centering effect of the longitudinal component of the centrifugal forces which may be present must be sufficiently effective to overcome the unstable moments of the normal component of the centrifugal forces (which normal component acts to oppose the lift forces) for any given operating conditions.

While I have shown the axes of the pivots for the individual blades in all cases as lying in planes radial to the main axis of rotation of the propeller or rotor and intersecting the main axis of rotation but at an angle other than a right angle and the blade axes as always intersecting their individual axes, I do not limit myself to either condition. Neither do I limit myself to always setting the blade axes so as to intersect the main axis of rotation.

Having thus described my invention, what I hereby claim as new and desire to secure by Letters Patent is:

1. In an aircraft, a revoluble thrust-producing system including a hub, a generally radially disposed airfoil blade pivotally secured to and carried by said hub by a corresponding single pitch-varying blade-root pivot whose axial line of pivotation is fixed in relation to the longitudinal axis of the blade-root and passes outwardly from said hub on the back or pressure side of the airfoil blade in a generally radial direction and diverges from the airfoil blade as it goes outwardly from said hub, and passes through the stable region of the resultant air-load vectors of the airfoil.

2. In an aircraft, a revoluble thrust-producing system including a hub, a generally radially disposed airfoil blade pivotally secured to and carried by said hub by a corresponding single pitch-varying blade-root pivot whose axial line of pivotation is fixed in relation to the longitudinal axis of the blade-root and is directed generally radially outward on the back or pressure side of the airfoil blade and is so disposed in relation to the weighted average chord-section of the airfoil as to cause the airfoil blade to tend to float or maintain itself at a predetermined angle of attack (about said pitch-varying blade-root pivot) when revolving at a constant speed and without acceleration or deceleration, and manually operable means for retaining the blades at a reduced angle of attack, namely, at an angle of attack below that at which they tend to maintain themselves at steady rotation by virtue of the aforesaid pivotation and for releasing said blades at will to permit them to assume their normal angle of attack.

3. In an aircraft, a revoluble thrust-producing system including a hub, a generally radially disposed airfoil blade pivotally secured to and carried by said hub by a corresponding single pitch-varying blade-root pivot whose axial line of pivotation directed generally radially outward on the back or pressure side of the airfoil blade and is so disposed in relation to the weighted average chord-section of the airfoil as to cause the airfoil to tend to float or maintain itself at a predetermined angle of attack (about said pitch-varying pivot) when revolving at a constant speed and without acceleration or deceleration, manually operable means for retaining the blades at a reduced angle of attack, namely, at an angle of attack below that at which they tend to maintain themselves at steady rotation by virtue of the aforesaid pivotation, and automatic means for releasing said blades to permit them to assume their normal angle of attack upon attaining a predetermined speed.

4. In an aircraft, a revoluble thrust-producing system including a hub, generally radially disposed airfoil blade pivotally secured to and carried by said hub by a corresponding single pitch-varying blade-root pivot carried by a blade-flapping pivot, the axial line of pivotation of said pitch-varying blade-root pivot being fixed in relation to the longitudinal axis of the blade-root and passing outwardly from said hub on the back or pressure side of the airfoil blade in a generally radial direction and diverging from the airfoil blade as it goes outwardly from said hub, whereby said airfoil blade will tend to float or maintain itself at a predetermined angle of attack (about said pitch-varying blade-root pivot) when revolving at a constant speed and whereby said angle of attack will be increased by increase in driving torque and decreased with decrease in driving torque.

5. In an aircraft, a revoluble thrust-producing system including a hub, a generally radially disposed airfoil blade pivotally secured to and carried by said hub by a trunnion-like pitch-varying blade root pivot whose axial line of pivotation is fixed in relation to the longitudinal axis of the blade-root and passes outwardly from said hub on the back or pressure side of the airfoil blade in a generally radial direction and diverges from the airfoil blade as it goes outwardly from said hub, and passes through the stable region of the resultant air-load vectors of the airfoil.

6. In an aircraft, a revoluble thrust-producing system including a hub, a generally radially disposed airfoil blade pivotally secured to and carried by said hub by a trunnion-like pitch-varying blade root pivot whose axial line of pivotation is fixed in relation to the longitudinal axis of the blade-root and is directed generally radially outward on the back or pressure side of the airfoil blade and is so disposed in relation to the weighted average chord-section of the airfoil as to cause the airfoil blade to tend to float or maintain itself at a predetermined angle of attack, about said pitch-varying blade-root pivot, when revolving at a constant speed and with acceleration or deceleration, and manually operable means for retaining the blades at a reduced angle of attack, namely, at an angle of attack below that at which they tend to maintain themselves at steady rotation by virtue of the aforesaid pivotation and for releasing said blades at will to permit them to assume their normal angle of attack.

7. In an aircraft, a revoluble thrust-producing system including a hub, a generally radially disposed airfoil blade pivotally secured to and carried by said hub by a trunnion-like pitch-varying blade root pivot whose axial line of pivotation is directed generally radially outward on the back or pressure side of the airfoil blade and is so disposed in relation to the weighted average chord-section of the airfoil as to cause the airfoil to tend to float or maintain itself at a predetermined angle of attack, about said pitch-varying pivot, when revolving at a constant speed and without acceleration or deceleration, manually operable means for retaining the blades at a reduced angle of attack, namely, at an angle of attack below that at which they tend to maintain themselves at steady rotation by virtue of the aforesaid pivotation, and automatic means for releasing said blades to permit them to assume their normal angle of attack upon attaining a predetermined speed.

8. In an aircraft, a revoluble thrust-producing system including a hub, a generally radially disposed airfoil blade pivotally secured to and carried by said hub by a trunnion-like pitch-varying blade-root pivot carried by a blade-flapping pivot, the axial line of pivotation of said pitch-varying blade-root pivot being fixed in relation to the longitudinal axis of the blade-root and passing outwardly from said hub on the back or pressure side of the airfoil blade in a generally radial direction and diverging from the airfoil blade as it goes outwardly from said hub, whereby said airfoil blade will tend to float or maintain itself at a predetermined angle of attack, about said pitch-varying blade-root pivot, when revolving at a constant speed and whereby said angle of attack will be increased by increase in driving torque and decreased with decrease in driving torque.

RICHARD H. PREWITT.

DISCLAIMER 2,234,196.—*Richard H. Prewitt*, Lansdowne, Pa. PROPELLER OR ROTOR CONSTRUCTION. Patent dated Mar. 11, 1941. Disclaimer filed May 22, 1945, by the patentee.

Hereby enters this disclaimer to claims 4 and 8 of said patent.

[*Official Gazette July 10, 1945.*]